United States Patent
Jacobs et al.

(10) Patent No.: US 10,243,441 B2
(45) Date of Patent: Mar. 26, 2019

(54) CONTROLLED MOTION SYSTEM HAVING A MAGNETIC FLUX BRIDGE JOINING LINEAR MOTOR SECTIONS

(71) Applicant: ROCKWELL AUTOMATION, INC., Milwaukee, WI (US)

(72) Inventors: Keith G. Jacobs, Loveland, OH (US); Glen C. Wernersbach, Cincinnati, OH (US)

(73) Assignee: Rockwell Automation, Inc., Milwaukee, WI (US)

( * ) Notice: Subject to any disclaimer, the term of this patent is extended or adjusted under 35 U.S.C. 154(b) by 1106 days.

(21) Appl. No.: 14/208,581

(22) Filed: Mar. 13, 2014

(65) Prior Publication Data

US 2014/0265645 A1 Sep. 18, 2014

Related U.S. Application Data

(60) Provisional application No. 61/792,150, filed on Mar. 15, 2013.

(51) Int. Cl.
| | |
|---|---|
| *H02K 41/02* | (2006.01) |
| *H02K 41/03* | (2006.01) |
| *H02K 1/12* | (2006.01) |
| *H02K 1/14* | (2006.01) |
| *B65G 54/02* | (2006.01) |

(52) U.S. Cl.
CPC ............ *H02K 41/02* (2013.01); *B65G 54/02* (2013.01); *H02K 1/12* (2013.01); *H02K 1/14* (2013.01); *H02K 41/031* (2013.01); *H02K 1/148* (2013.01); *H02K 2201/15* (2013.01)

(58) Field of Classification Search
CPC .... H02K 41/02; H02K 41/031; H02K 41/033; H02K 1/148; H02K 1/12; H02K 2201/15; H05K 5/0204
USPC .......... 310/12.09, 12.02, 12.11, 12.14, 12.15, 310/12.07, 12.25, 12.24, 12.05, 216.099, 310/216.101, 216.102, 216.103
See application file for complete search history.

(56) References Cited

U.S. PATENT DOCUMENTS

| | | | | |
|---|---|---|---|---|
| 3,488,535 A | * | 1/1970 | Baermann | H02K 49/00 310/105 |
| 3,510,730 A | * | 5/1970 | Teodorescu | H01F 7/06 310/103 |
| 3,594,622 A | | 7/1971 | Inagaki | |
| 4,095,150 A | * | 6/1978 | Senckel | H02K 17/16 310/12.19 |

(Continued)

OTHER PUBLICATIONS

European Application No. EP14160321, Search Report, dated Feb. 2, 2018, 11 pgs.

*Primary Examiner* — Bernard Rojas
*Assistant Examiner* — Maged M Almawri
(74) *Attorney, Agent, or Firm* — Fletcher Yoder, P.C.

(57) ABSTRACT

A linear controlled motion system comprises a track formed from one or more track sections and having at least one mover mounted to the track and effective for receiving articles at one location and transporting the articles to another location. The system includes at least one magnetic linear motion motor for providing a magnetic field effective for moving each mover in a controlled motion along the track and a magnetic flux bridge for reducing changes in the magnetic flux that reduces the efficiency or interferes with the operation of the controlled motion system.

17 Claims, 6 Drawing Sheets

(56) References Cited

U.S. PATENT DOCUMENTS

| | | | |
|---|---|---|---|
| 4,728,382 A | 3/1988 | Raschbichler | |
| 6,023,118 A * | 2/2000 | Gutris | H02K 1/141 310/164 |
| 6,148,967 A * | 11/2000 | Huynh | H02K 49/043 188/161 |
| 6,265,804 B1 * | 7/2001 | Nitta | H02K 1/148 310/193 |
| 6,759,785 B2 * | 7/2004 | Miyake | H02K 1/14 310/254.1 |
| 7,230,355 B2 * | 6/2007 | Lin | H02K 41/033 310/12.01 |
| 7,800,256 B2 * | 9/2010 | Jajtic | H02K 1/06 310/12.01 |
| 8,283,815 B2 * | 10/2012 | Vollmer | H02K 21/44 310/12.21 |
| 8,704,422 B2 * | 4/2014 | Jurkowski | H02K 1/146 29/596 |
| 2002/0117905 A1 * | 8/2002 | toba | H02K 41/03 310/12.15 |
| 2003/0230941 A1 * | 12/2003 | Jacobs | B60L 15/38 310/12.19 |
| 2004/0256919 A1 | 12/2004 | Hashimoto et al. | |
| 2006/0097584 A1 | 5/2006 | Morel | |
| 2009/0134626 A1 * | 5/2009 | Hoppe | H02K 41/033 290/55 |
| 2012/0175994 A1 * | 7/2012 | Flynn | H02K 1/148 310/216.106 |
| 2013/0035784 A1 | 2/2013 | Wernersbach et al. | |
| 2013/0038169 A1 * | 2/2013 | Sato | H02K 1/148 310/216.009 |

* cited by examiner

CONTROLLED MOTION SYSTEM HAVING A MAGNETIC FLUX BRIDGE JOINING LINEAR MOTOR SECTIONS

CROSS REFERENCE TO RELATED APPLICATIONS

This application is a Non-Provisional Patent Application of U.S. Provisional Patent Application No. 61/792,150, entitled "Controlled Motion System Having a Magnetic Flux Bridge Joining Linear Motor Sections", filed Mar. 15, 2013, which is herein incorporated by reference.

BACKGROUND

The present invention relates generally to controlled motion systems and more specifically, the present invention relates to controlled motion systems having more than one linear motor sections and means of joining the linear motor sections together using a magnetic flux bridge such that the likelihood of interruption or a change in the level of magnetic flux along and between the linear drive sections is reduced.

The application of controlled motion systems to a wide variety of processes (e.g. for packaging, transporting objects, assembly automation, and processes involving use of machine tools, etc.) provides the advantage of increasing both the speed and flexibility of the process. Controlled motion systems comprise linear motors, such as linear motors, that employ a moving magnetic field to directly motor a moving element, sometimes known as a carriage, pallet, tray, or mover (referred to here collectively as a "mover"). Such linear motors reduce or eliminate the need for gear heads, shafts, keys, sprockets, chains and belts often used with traditional rotary motors. This reduction of mechanical complexity provides both reduced cost and increased speed capability by virtue of reducing inertia, compliance, damping, friction and wear normally associated with more conventional motor systems. Further, controlled motion systems also provide greater flexibility than rotary motor systems by allowing each individual mover to be independently controlled along its entire path.

Controlled motion systems typically comprise interconnected track sections, each section has a plurality of individually controlled coils that provide independent control of one or more movers that travel along the track. Such systems include a positioning system that often employs a plurality of linear encoders spaced at fixed positions along the track and linear encoder strips mounted on each mover to sense their position. Such linear encoders are typically "incremental absolute" position encoders that are coupled to a controller or counter, and that operate by sensing and counting incremental pulses (or that digitize sine/cosine signals to create these pulses) to count up or down after a mover has traveled past a reference point. Such incremental encoders, however, can provide an absolute position signal only after performing a homing and commutation alignment procedure for each mover at power up. This requires moving each mover a certain distance along the track to find the zero reference position and the magnetic pole positions.

The prior art is filled with similar such controlled motion systems utilizing linear motors. However, such systems suffer from a particular deficiency. Specifically, tracks are generally assembled by combining individual track sections, wherein each section is adhered or connected to an adjacent section along their contact surfaces, such as by use of an epoxy or other such material, and then covered or encased in stainless steel or similar material. During actual use of the system, a mover travels along the track from section to section through employment of a magnetic field created by the individually controlled coils positioned along each section of the track. Often, the region between where the mover leaves one section of the track and reaches the next section, there is typically a disturbance or weakening in the magnetic field that results in a relatively large increase in resistance or cogging as compared to the magnetic field in the middle of a section. This disruption or weakening in the magnetic field is a result of an air gap along the contact surfaces of the assembled track sections generally caused by non-precise milling of the adjacent track sections so exposed cores do not magnetically touch, or by the epoxy or other non-magnetic covering (i.e., stainless steel) creating a substantially non-magnetic gap between the individual track sections. This disruption or weakening in the magnetic field between adjacent track sections is problematic in that it often leads to lost performance, noise, false readings, or crashes along the track. Further, when a mover experiences a disruption or weakening in the magnetic field during operation of the motion control system, the counting process by the controller or counter is often lost or the pulse counting disrupted. Such disruption or weakening requires the movers to be driven back to a reference point of home position to initialize or reset the counting process. This initialization or resetting of the counting process results in significant loss of production time and often lost product. Further, depending on the location, the disruption or weakening can result in stoppage of the entire control motion system often resulting in the need to reset or restart other processes.

Accordingly, what is needed is a controlled motion system comprising one or more linear motors positioned along a track formed from two or more sections such that the likelihood of interruption or the level of disturbance or weakening in the magnetic field along and between adjacent linear motor sections is reduced or minimized.

BRIEF DESCRIPTION

Various embodiments presently disclosed include a controlled motion system comprising a track formed from two or more track sections positioned adjacent to one another, at least one linear motor positioned along and coupled to the track sections, one or more movers mounted for moving along the track by way of a controlled magnetic field formed by the at least one linear motor, and at least one magnetic flux bridge between or connecting each adjacent track section, such that any changes, disturbance, or weakening in the controlled magnetic field between adjacent track sections is reduced.

The magnetic flux bridge may comprise magnetically conductive material that allows for a substantially consistent magnetic field to exist between the mover and adjacent track sections over which the mover is moving.

The magnetic flux bridge may be in the form of shims positioned between adjacent track sections, magnetically conductive adhesives between adjacent sections, magnetically conductive covers encasing the gap between sections, or a combination thereof.

The magnetic flux bridge may also be in the form of a ferromagnetic plate directly connected to the stator element of each adjacent track section.

The magnetic flux bridge may comprise a ferromagnetic plate having first portion connected to the stator element of a first track section and a second portion connected to the stator element of a second track section.

The magnetic flux bridge may operate to minimize the gap between adjacent track sections that may cause a disturbance, change, or weakening in the magnetic field.

The magnetic flux bridge may have a cross section such that the magnetization of the magnetic flux bridge is not saturated.

The magnetic flux bridge may be in the form of ferromagnetic plate sections integral with respective stators of adjacent linear motor track sections and effective for reducing any disruption, change, or weakening of the magnetic field between the two adjacent track sections.

In accordance with certain aspects of the present disclosure, a controlled motion system comprises a track formed from two or more track sections positioned adjacent to one another, at least one linear motor positioned along and coupled to the track sections, one or more movers mounted for moving along the track by way of a controlled magnetic field formed by the at least one linear motor, and at least one magnetic flux bridge between or connecting each adjacent track section, such that any disturbance, change, or weakening in the controlled magnetic field between adjacent track sections is reduced.

Other advantages, objects, and embodiments of the invention will be apparent from the following description, the accompanying drawings and the appended claims.

DRAWINGS

In the present disclosure, reference is made in the following description to the accompanying drawings, in which.

Figure 7:
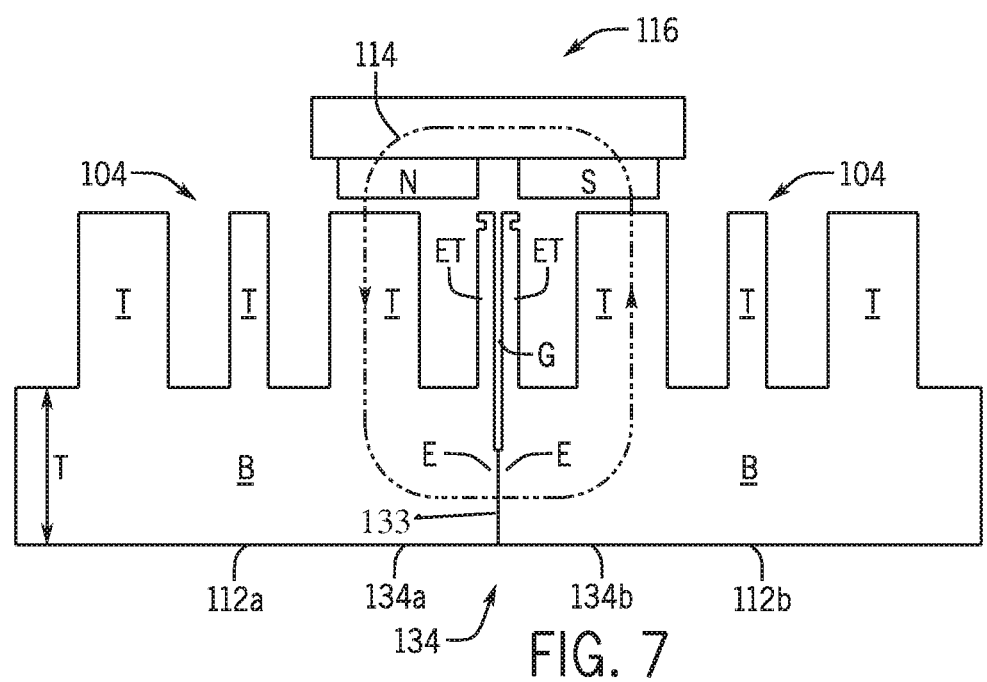
Figure 8:
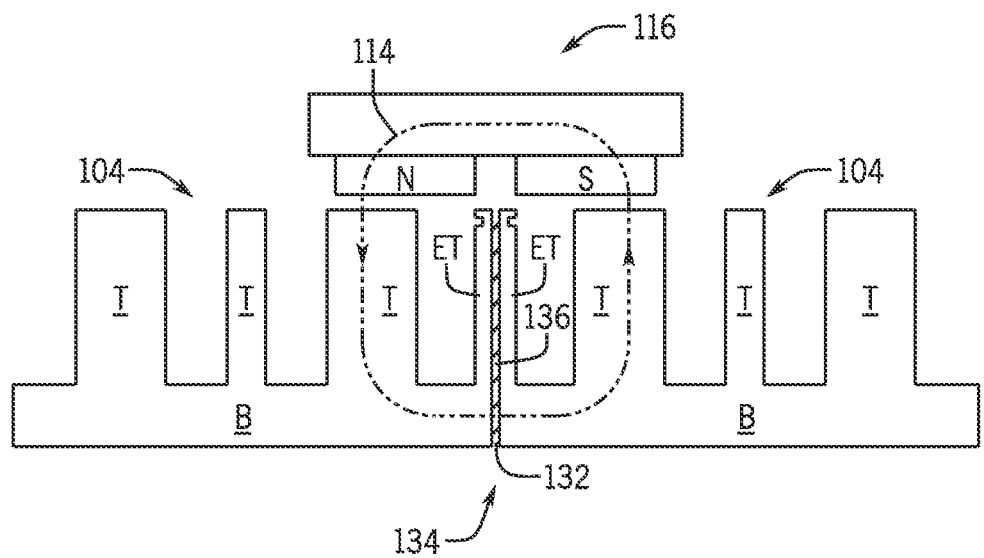
Figure 9:
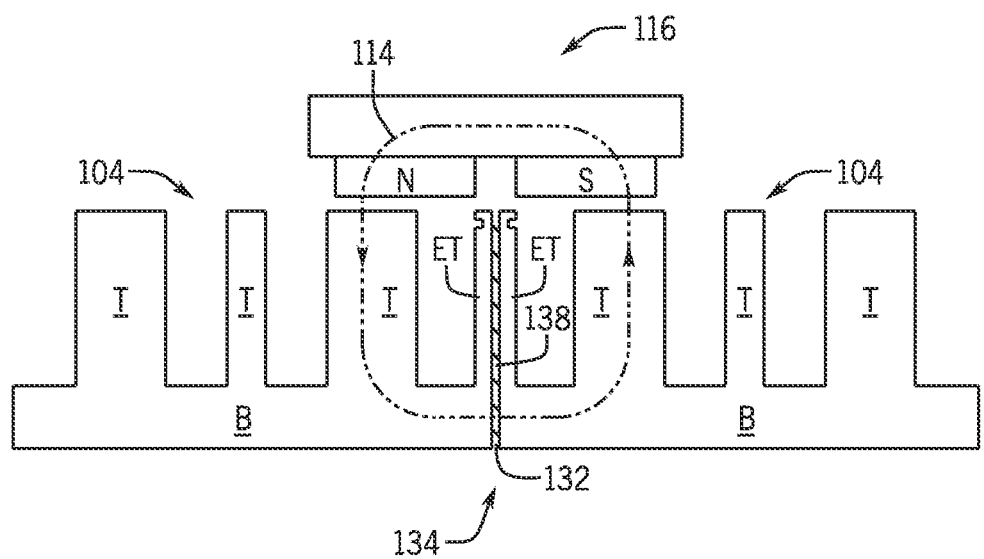

FIG. 7 is a schematic illustration of a side view of another exemplary embodiment showing two adjacent track sections of a linear motion track connected together and having a magnetic flux bridge in the form of a ferromagnetic plate sections integral with the respective stators and effective for reducing any disruption, change, or weakening of the magnetic field between the two adjacent track sections;

FIG. 8 is a schematic illustration of a side view of another exemplary embodiment showing two adjacent track sections of a linear motion track connected together and a magnetic flux bridge in the form of a one or more ferromagnetic shims positioned within a gap formed between two adjacent track sections and effective for reducing disruption, change, or weakening of the magnetic field between the two adjacent track sections; and FIG. 9 is a schematic illustration of a side view of another exemplary embodiment showing two adjacent track sections of a linear motion track connected together and a magnetic flux bridge in the form of a ferromagnetic adhesive positioned within the gap formed between two adjacent track sections and effective for reducing disruption, change, or weakening of the magnetic field between the two adjacent track sections.

DETAILED DESCRIPTION

The present disclosure relates to a linear controlled motion system, such as a system having a track formed from one or more track sections, and having at least one mover mounted to the track and effective for receiving articles at one location and transporting the articles to another location. The system includes at least one magnetic linear motion motor for providing a magnetic field effective for moving each mover in a controlled motion along the track. Preferably, the controlled motion system includes a magnetic flux bridge for reducing changes in the magnetic flux that would otherwise reduce the efficiency or interfere with the operation of the controlled motion system. In the present disclosure, specific terminology will be resorted to for the sake of clarity. However, the technology and concepts are not intended to be limited to the specific terms so selected, and it is to be understood that each specific term includes all technical equivalents that operate in a similar manner to accomplish a similar purpose.

Referring to FIGS. 1 through 4, a schematic representation of a linear controlled motion system 100 is shown comprising a track 102 formed from two or more interconnected track sections 104 having a magnetic motor system 106 comprising activation elements 108, such as a plurality of electromagnet coils 110 coupled to a stator 112 mounted along the track sections 104. The electromagnet coils 110 operate to create an electromagnetic field illustrated by magnetic flux lines 114. Coupled to the track 102 is at least one mover 116 mounted to permit travel along the track 102. Each mover 116 is controlled and may generally move independent of other movers. Reaction elements 118 may comprise one or more magnets 120, such as rare-earth permanent magnets. The reaction elements 118 on each mover 116 cooperate with the activation elements 108 positioned along the track 102 to produce relative movement therebetween when the activation elements 108 are energized and/or de-energized. Each mover 116 further includes a control sensor 122 that provides a signal for use by a control system 124 for operating the motor system 106 by energizing and/or de-energizing the activation elements 108 positioned along the track 102 thereby producing controlled movement of each mover 116. In an exemplary embodiment, as illustrated in FIG. 5, the controlled motion system 100 includes a positioning system 126 that employs a plurality of linear encoders 128 spaced at fixed positions along the track 102, and that cooperate with the control sensor 122 mounted on each mover 116 to provide signals to the control system 124 for sensing each mover's position along the track 102. Preferably, each control sensor 122 comprises a linear encoder, such as an "incremental absolute" position encoder, that is coupled to the control system 124, and that operates to sense and count incremental pulses (or digitize sine/cosine signals to create these pulses) after a mover 116 has traveled past a reference point (not shown)).

Figure 1:
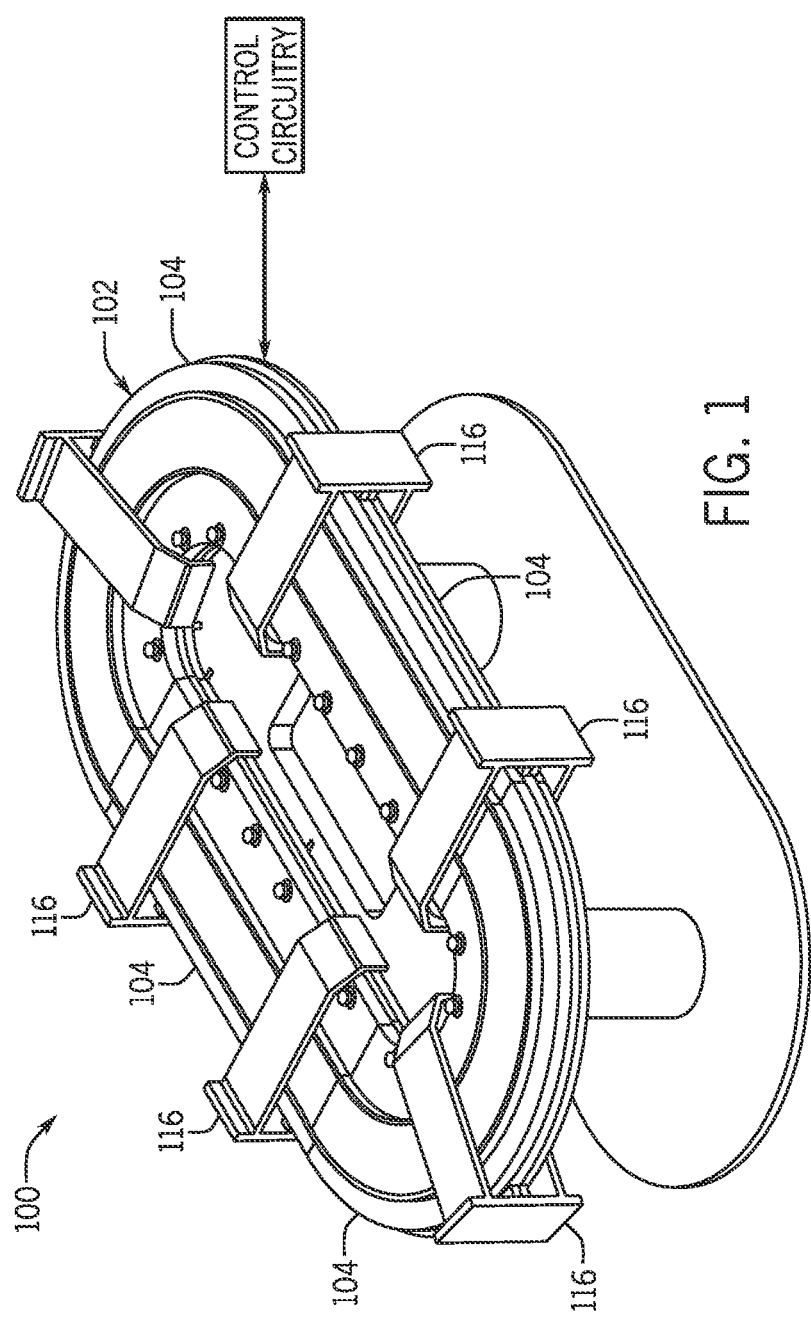
FIG. 1 is a schematic representation of a linear controlled motion transport system comprising a linear magnetic motor system, a track formed from at least two track sections and having at least one mover effective for moving along the track.
Figure 2:
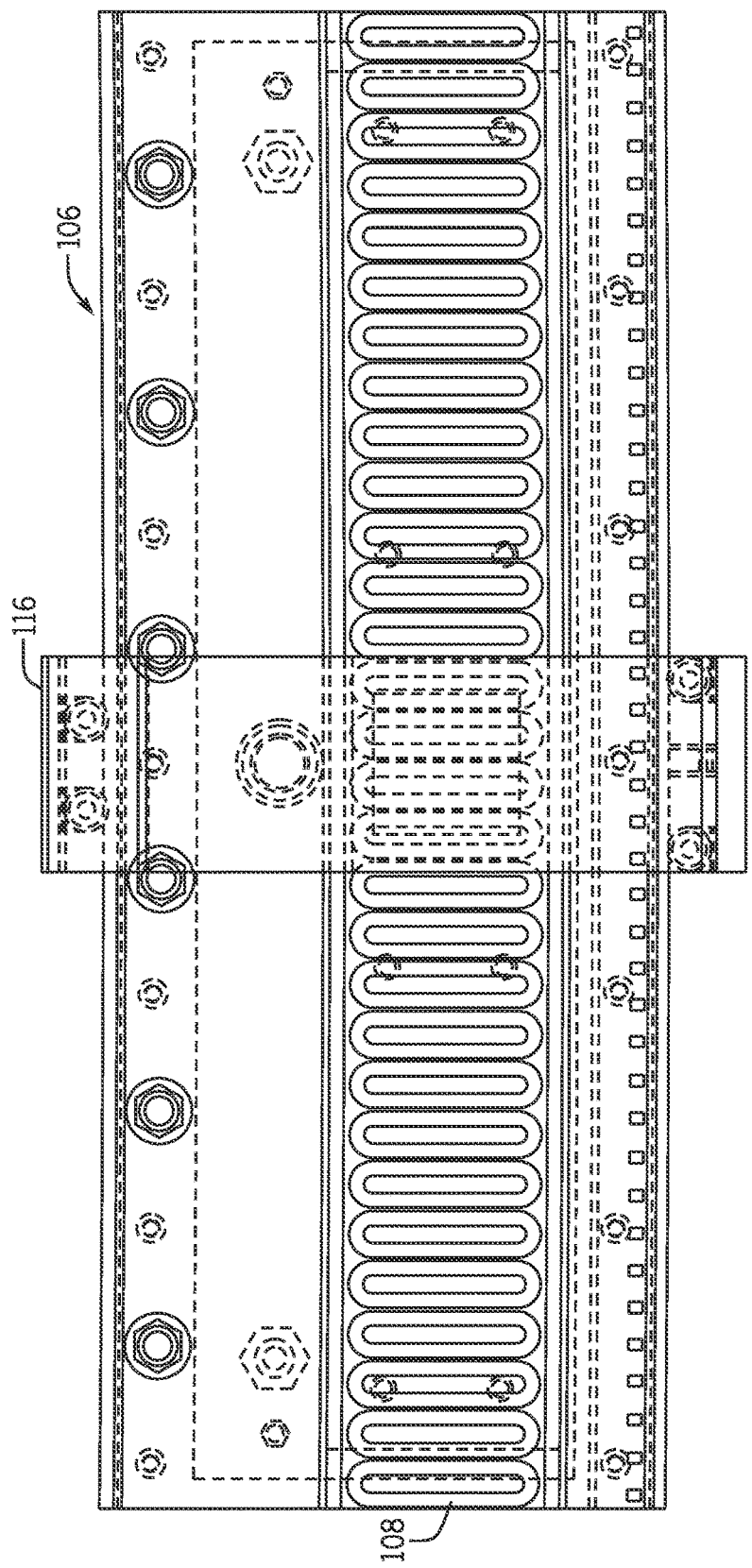
FIG. 2 is a schematic illustration of a side view of a track section of the linear motion track of FIG. 1 showing a plurality of electromagnet coils coupled to a stator and a mover mounted for movement along the track section.
Figure 3:
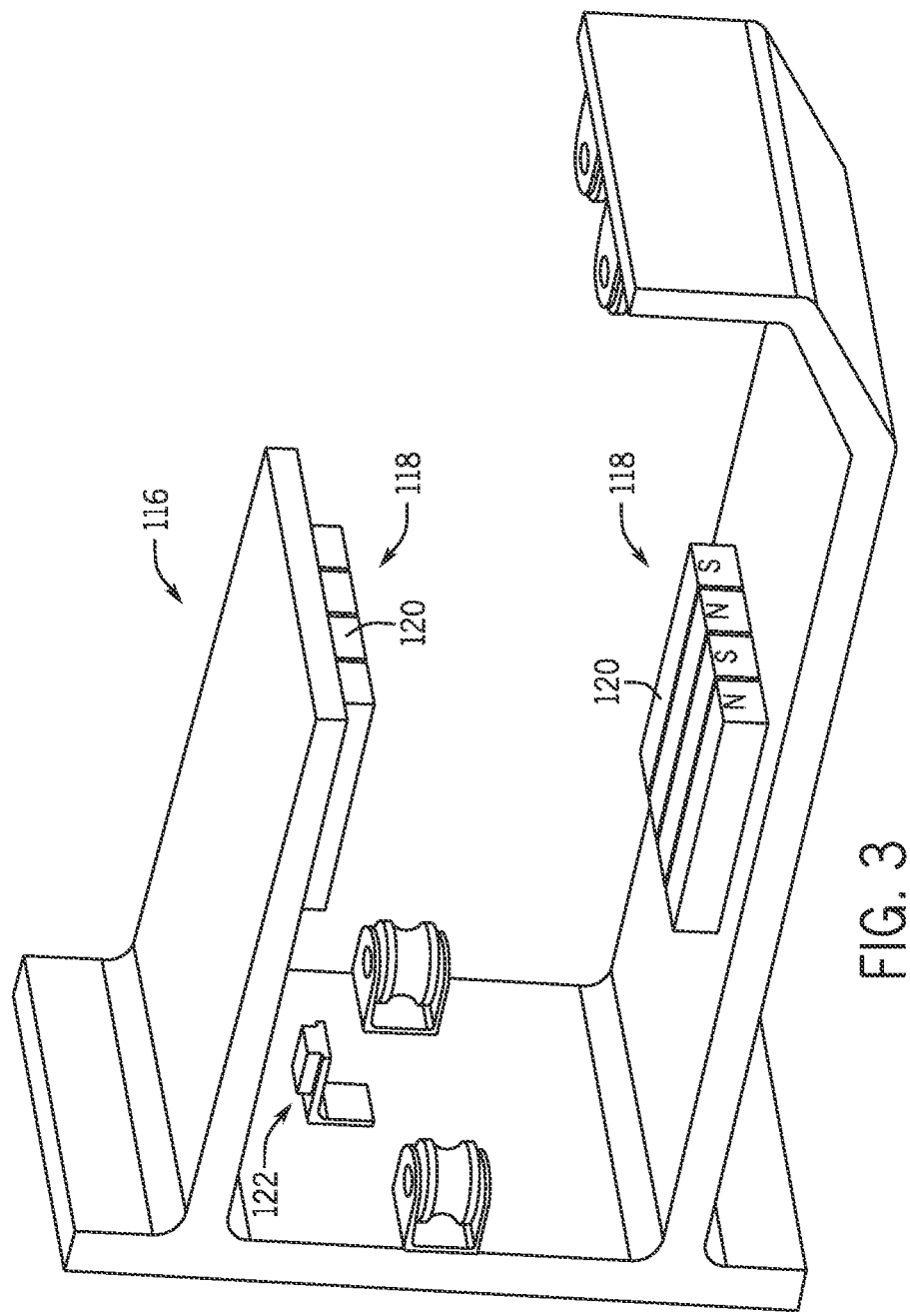
FIG. 3 is a schematic illustration of a perspective view of a mover having reaction elements mounted thereon which cooperate with the activation elements positioned along the track of FIG. 1 and further showing a control sensor for providing a signal for use by a control system in moving the mover along the track.
Figure 4:
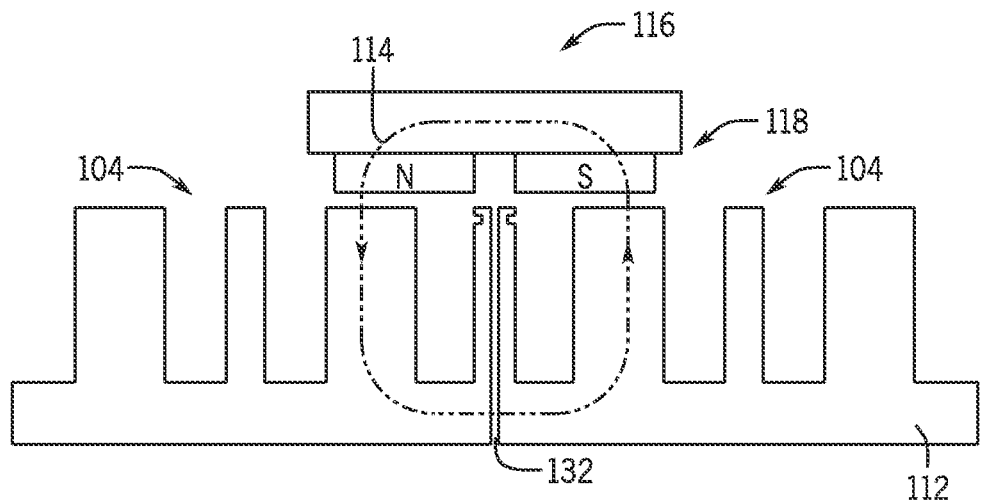
FIG. 4 is a schematic illustration showing a gap between the two adjacent track sections that can create a disturbance, change, or weakening in the magnetic field along the two adjacent track sections.
Figure 5:
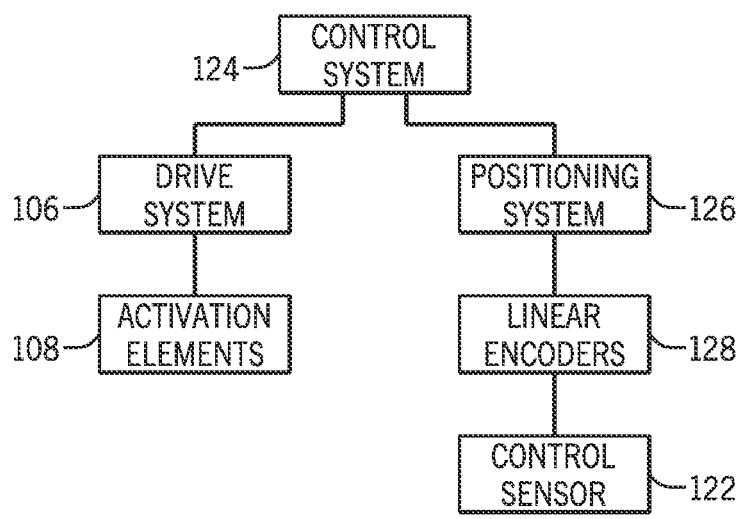
FIG. 5 is an illustration of an exemplary methodology of the control system interacting with the motor system and positioning system of the linear motion control system.

Referring to FIG. 4, a portion of the track 102 is shown having two adjacent interconnected track sections 104 and a plurality of electromagnetic coils 110 formed along stators 112 that are mounted along the track sections 104, and that operate to create an electromagnetic field mounted along each track section 104, as illustrated by magnetic flux lines 114 forming a closed loop with the mover 116 and the adjacent track sections 104. As shown, a gap 132, such as an air gap, exists between the track sections 104. Some gap, or a gap at some point between the sections may be useful, however, to facilitate securement of mechanical elements, such as a cover (not shown). However, the gap can create weakening or change in the magnetic flux across the gap 132. This disruption or change in the magnetic field between the adjacent track sections 104 is problematic in that it may lead to lost performance, noise, false readings, or unwanted interaction of movers along the track 102. Further, when a mover 116 experiences a change or weakening in the magnetic field during operation of the control motion system 100, the control sensor 122 may sense this change or weakening such that the counting process performed by the control system 124 may be lost or the pulse counting disrupted. Such disruptions may also require the movers 116 to be driven back to a reference point or home position to initialize or reset the counting process. This process results in significant loss of production time and lost production.

Figure 6:
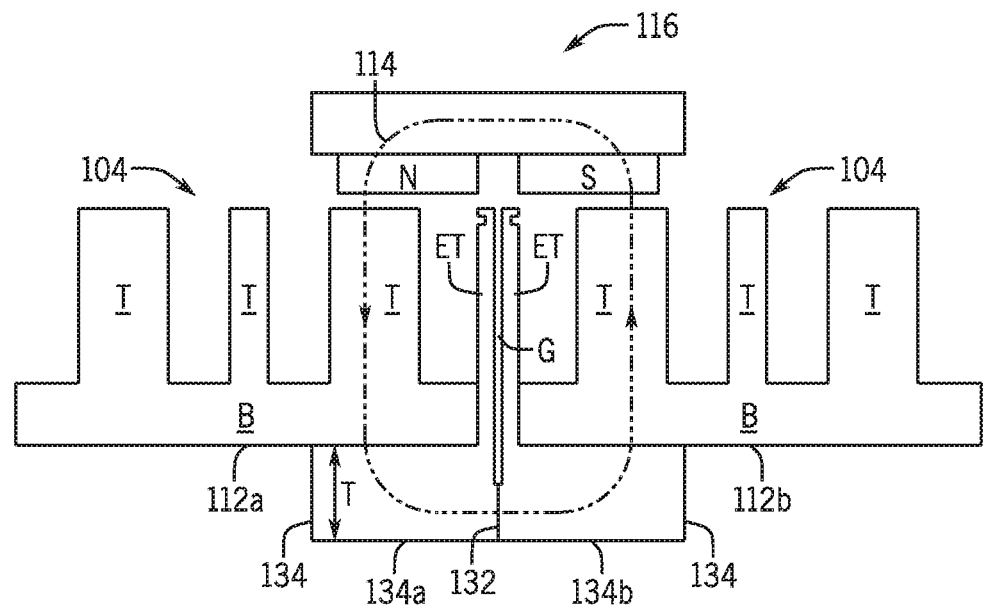
FIG. 6 is a schematic illustration of a side view of an exemplary embodiment showing two adjacent track sections of a linear motion track connected together and having magnetic flux bridge in the form of a ferromagnetic plate effective for reducing any disruption, change, or weakening of the magnetic field between the two adjacent track sections.

Referring to FIG. 6 an exemplary embodiment of the present disclosure is shown in which two adjacent track sections 104 of a linear motion track 102 are connected together and include a magnetic flux bridge 134 effective for reducing disruption, change, or weakening of the magnetic field between the two adjacent track sections 104 created by gap 132 as shown in FIG. 4. The magnetic flux bridge 134 may be formed in two sections 134a and 134b positioned adjacent to each other and the stators 112a and 112b, respectively, such that that they minimize any disruption, change, or weakening in the magnetic field between two adjacent track sections 104 by providing a flux bridge over or bypassing the gap 132 between the adjacent track sections 104. As shown, the magnetic flux bridge 134 may be positioned and mounted to stators 112 to permit the magnetic flux 114 to flow such that the magnetic field is substantially consistent along or between the stators 112 of adjacent track sections 104, the magnetic flux bridge 134, and the mover 116. The magnetic flux bridge 134 may comprise a ferromagnetic plate or other similar structure directly connected to the stator 112 of each adjacent track section 104, along the underside of the stators. It should be understood that the size, such as thickness T, and the cross sectional area of the magnetic flux bridge 134 is dependent on the particular ferromagnetic material forming the magnetic flux bridge and the strength of the magnetic field, and may be selected to ensure that the magnetic flux 114 is not saturated. It should be understood that adjacent surfaces 140 of the magnetic flux bridge 134 may be precisely machined to sufficiently reduce or minimize any gap between the two surfaces, at least in a region through which the flux is to be directed. Such precise machining at such locations can be easily and inexpensively done, and reduces the need to precisely machine the entire adjacent surfaces 142 of the stator sections 112a and 112b.

It may be noted that, in the embodiment illustrated in FIG. 6, each stator section 112a and 112b comprises a generally contiguous base B, with contiguous teeth T that face the mover 16 as it moves along the track sections. These stator sections may be made of multiple pieces of laminate material (e.g., magnetic steel) that may be stamped, cut, or otherwise formed, and then joined side-by-side to form the stator sections illustrated. The teeth may have different widths and spacing, as illustrated, and depending upon the mechanical, electrical, and magnetic design of the device. At locations corresponding to the location of the gap 132, end teeth ET may be formed as illustrated. Such end teeth may allow for some gap, or a portion of a gap, as indicated by the letter G, to remain, such as for attachment of a cover (not shown), or other mechanical, electrical, or magnetic reasons. However, in the illustrated embodiment, the gap 132 is reduced or substantially eliminated between the contiguous bases B such that flux may be effectively channeled between the adjacent stator sections. The particular design for the laminations, and variants of such designs are also considered of interest in accordance with the present disclosure, for improving performance of the device.

Referring to FIG. 7, another embodiment is shown in which two adjacent track sections 104 of a linear motion track 102 are connected together and include a magnetic flux bridge 134 effective for reducing disruption, change, or weakening of the magnetic field between the two adjacent track sections 104. In this embodiment, the magnetic flux bridge 134 is formed in two sections 134a and 134b and each section is formed integral with respective stators 112a and 112b. In another embodiment, the two sections 134a and 134b are attached to the respective stators 112a and 112b, such as by bolts, screws, magnetically conductive adhesive, or other suitable method. The magnetic flux bridge 134 may comprise a ferromagnetic plate or other similar structure directly connected to the stator 112 of each adjacent track section 104, such as along the underside of the stators. Here again, it should now be understood that the size, such as thickness T, and the cross sectional area of the magnetic flux bridge 134 is dependent on the particular ferromagnetic material forming the magnetic flux bridge and the strength of the magnetic field, and may be selected to ensure that the magnetic flux 114 is not saturated. It should be understood, here again that adjacent surfaces 140 of the magnetic flux bridge 134 may be machined to sufficiently reduce or minimize any gap between the two surfaces, and that such machining can be easily and inexpensively done at flux-channeling locations to reduce the need to precisely machine the entire adjacent surfaces 142 of the stator sections 112a and 112b.

Here again, the stator sections 112a and 112b may be formed of stamped (or otherwise formed) laminate layers that are stacked to form the stator sections. The end teeth ET of such laminates may approach one another while leaving a portion of a gap G, while the contiguous bases B of the stator sections, formed by the base of the laminates, may be extended by an extension E to approach one more closely to reduce or effectively eliminate a base gap 133 to more effectively channel flux from one base section B (e.g., of stator section 112a) to the base section B of the adjacent stator section (e.g., 112b). Here again, the design of such stator sections, and of the laminates of which they may be comprises, are considered of interest as potentially significant advances in the art. In particular, in the illustrated design, the teeth T comprise teeth of different widths. The end teeth ET and the extension E are sized such that when stator sections comprising similar laminates are placed endto-end, as shown, a base gap 133 between adjacent base extensions is reduced or eliminated, while a gap G between the end teeth is maintained, and a total combined dimension of the gap G between the end teeth and widths of the adjacent end teeth is approximately equal to a width of at least one of the plurality of teeth (e.g., the narrower teeth shown in the figure).

In another embodiment shown in FIG. 8 the magnetic flux bridge 134 comprises one or more ferromagnetic shims 136 positioned within the gap 132 between adjacent track sections 104. In another embodiment shown in FIG. 9 the magnetic flux bridge 134 comprises a magnetically conductive adhesive 138 positioned within the gap 132 between adjacent track sections 104. Here again, it should be apparent that the use of ferromagnetic shims 136 reduces the need to precisely machine the adjacent surfaces 142 of the stator sections 112*a* and 112*b*.

It should be understood that the magnetic bridge of the subject may comprise a ferromagnetic plate, such as shown in FIGS. 6 and 7; one or more ferromagnetic shims, such as shown in FIG. 8; magnetically conductive adhesives, such as shown in FIG. 9; or a combination thereof.

The controlled motion system and the magnetic flux bridge of the subject invention operate to provide a substantially greater continuity of the magnetic field operating to move a mover from one track section to another track section.

The magnetic flux bridge may comprise any one or more forms of magnetically conducting articles and materials effective for operating such that the magnetic field along the carriage and adjacent track sections is substantially maintained without loss or disruption of the magnetic flux.

The controlled motion system may thus comprise one or more linear motors positioned along a track formed from two or more sections, and a magnetic flux bridge that operates to reduce or minimize the likelihood of interruption or the level of disturbance or weakening in the magnetic field along and between adjacent linear motor sections. The use of a magnetic flux bridge may reduce the need to have precise manufacturing tolerances between stators of adjacent track sections.

While this disclosure has set forth specific embodiments presently contemplated, it is evident that many alternatives, modifications and variations will be apparent to those skilled in the art. Accordingly, the embodiments set forth above are intended to be illustrative, not limiting. Various changes may be made without departing from the spirit and scope of the invention. Similarly, for example, it has been found that it may be desirable to provide a gap, such as between end teeth, with a magnetic filler "bridge" disposed within the gap. This may prevent or reduce a tendency to "cog" as the mover is displaced along the track sections, while only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A controlled motion system comprising:
 a track formed from two or more track sections positioned adjacent to one another;
 stator sections, wherein each stator section of the stator sections is positioned along and coupled to a track section of the two or more track sections, each stator section comprising a plurality of coils, a plurality of teeth, and a plurality of end teeth, wherein each end tooth of the plurality of end teeth comprises a width that is less than one half of a width of any one tooth of the plurality of teeth;
 one or more movers mounted for moving along the track by way of a controlled magnetic field formed by the coils; and
 at least one magnetic flux bridge physically contacting a first end tooth of a first stator section of the stator sections with a second end tooth of a second stator section of the stator sections adjacent to the first stator section to reduce any changes, disturbance, or weakening in the controlled magnetic field between the adjacent first and second stator sections, wherein the magnetic flux bridge comprises a magnetically conductive material contacting the first end tooth and the second end tooth, wherein the width of the first end tooth, the width of the second end tooth, and a width of the magnetically conductive material combines into a combined width approximately equal to a width of at least one tooth of the plurality of teeth.

2. The controlled motion system of claim 1, wherein the magnetic flux bridge comprises magnetically conductive material directly connected to the stator sections of each track section.

3. The controlled motion system of claim 1, wherein the magnetic flux bridge operates to provide a substantially consistent magnetic field between the mover and adjacent track sections over which the mover is moved.

4. The controlled motion system of claim 1, wherein the magnetic flux bridge comprises shims positioned between said adjacent track sections.

5. The controlled motion system of claim 1, wherein the magnetic flux bridge comprises a conductive adhesive between the adjacent track sections.

6. The controlled motion system of claim 1, wherein the magnetic flux bridge comprises a ferromagnetic plate directly connected to stator elements of the adjacent track sections.

7. The controlled motion system of claim 1, wherein the magnetic flux bridge comprises a ferromagnetic plate having a first portion connected to a stator element of said first track section and a second portion connected to a stator element of said second track section.

8. The controlled motion system of claim 1, wherein said magnetic flux bridge reduces a portion of the gap between said adjacent track sections while leaving a portion of the gap for mechanical attachment.

9. The controlled motion system of claim 1, wherein the magnetic flux bridge has a cross sectional area selected such that the magnetic flux bridge is not saturated by flux.

10. A stator for a controlled motion system comprising;
 a first stator section having a first contiguous base, a first plurality of coils, and a plurality of first teeth including a first end tooth, wherein the first end tooth comprises a width that is less than one half of a width of any remaining tooth of the plurality of teeth;
 a second stator section having a second contiguous base, a second plurality of coils, and a plurality of second teeth including a second end tooth, wherein the second end tooth comprises a width that is less than one half of a width of any remaining tooth of the plurality of second teeth, the second stator section being disposed adjacent to the first stator section such that the first and second end teeth are generally adjacent to one another;
 a section gap formed between the first and second end teeth; and a magnetic flux bridge formed between the first and second bases to reduce or eliminate a base gap between the first and second bases, wherein the magnetic flux bridge comprises a magnetically conductive material connected to the first stator section and the second stator section, wherein the width of the first end tooth, the width of the second end tooth, and a width of the magnetically conductive material combines into a combined width approximately equal to a width of at least one tooth of the plurality of teeth or at least one tooth of the plurality of second teeth.

11. The stator claim 10, wherein the magnetic flux bridge comprises magnetically conductive material connected directly to the first end tooth of the first stator section and the second end tooth of the second stator section.

12. The stator of claim 10, wherein the base gap of the magnetic flux bridge is smaller than the section gap.

13. The stator of claim 10, wherein the magnetic flux bridge comprises shims positioned between the adjacent stator sections.

14. The stator of claim 10, wherein the magnetic flux bridge comprises a conductive adhesive between said adjacent stator sections.

15. The stator of claim 10, wherein the magnetic flux bridge comprises a ferromagnetic plate directly connected to stator sections.

16. The stator of claim 10, wherein the magnetic flux bridge comprises a ferromagnetic plate having a first portion disposed adjacent to the first stator section and a second portion disposed adjacent to the second stator section.

17. The stator of claim 10, wherein each stator section comprises a plurality of laminates that, when assembled, provide the section gap and the base gap.

* * * * *